(12) United States Patent
Ohtani (10) Patent No.: US 9,708,007 B2
(45) Date of Patent: Jul. 18, 2017

(54) VEHICLE BODY REINFORCEMENT APPARATUS

(71) Applicant: AISIN SEIKI KABUSHIKI KAISHA, Kariya-shi, Aichi-ken (JP)

(72) Inventor: Yoshifumi Ohtani, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/842,323

(22) Filed: Sep. 1, 2015

(65) Prior Publication Data
US 2016/0059808 A1 Mar. 3, 2016

(30) Foreign Application Priority Data

Sep. 1, 2014 (JP) .................................. 2014-176742

(51) Int. Cl.
| | |
|---|---|
| *B62D 25/00* | (2006.01) |
| *B60R 19/02* | (2006.01) |
| *B62D 25/20* | (2006.01) |
| *B60R 19/00* | (2006.01) |

(52) U.S. Cl.
CPC .............. *B62D 25/00* (2013.01); *B60R 19/02* (2013.01); *B62D 25/20* (2013.01); *B60R 2019/007* (2013.01)

(58) Field of Classification Search
CPC ........ B62D 25/00; B62D 25/20; B62D 21/15; B60G 2206/014; B60G 2206/605; F19F 9/08; F19F 9/3207
See application file for complete search history.

(56) References Cited

U.S. PATENT DOCUMENTS

| | | | | |
|---|---|---|---|---|
| 2,705,633 A | * | 4/1955 | Potter, Jr. ................ | B61F 5/122 |
| | | | | 105/198.4 |
| 3,866,724 A | * | 2/1975 | Hollnagel ................ | F16F 7/09 |
| | | | | 188/129 |

(Continued)

FOREIGN PATENT DOCUMENTS

| | | | |
|---|---|---|---|
| JP | 3113995 U | * | 9/2005 |
| JP | 4865698 B2 | | 2/2012 |

OTHER PUBLICATIONS

Aug. 17, 2005, JPO, JP 3113995 U, Machine translation of Description.*

*Primary Examiner* — James A English
(74) *Attorney, Agent, or Firm* — Buchanan Ingersoll & Rooney PC (57) ABSTRACT

A vehicle body reinforcement apparatus extending along at least one of a front-rear direction and a width direction of a vehicle body, the vehicle body reinforcement apparatus includes at least two brackets via which the vehicle body reinforcement apparatus is fixed to the vehicle body, a housing connected to one of the two brackets, a rod including a first end portion that is movably housed within the housing and a second end portion connected the other of the two brackets, a spring member disposed between the first end portion of the rod and the housing and applying a biasing force to the rod against a force for increasing and decreasing a distance between the two brackets in an axial direction of the rod, and a friction mechanism mounted to the housing and pressing the rod in a direction orthogonal to the axial direction of the rod.

5 Claims, 7 Drawing Sheets

(56) References Cited

U.S. PATENT DOCUMENTS

| | | | | |
|---|---|---|---|---|
| 4,100,818 A * | 7/1978 | Woollard | ............... | F16H 9/18 |
| | | | | 474/13 |
| 4,281,487 A * | 8/1981 | Koller | ............... | F16F 7/125 |
| | | | | 248/351 |
| 4,955,467 A * | 9/1990 | Kallenbach | ............... | F16F 7/09 |
| | | | | 188/134 |
| 5,310,157 A * | 5/1994 | Platus | ............... | F16F 3/026 |
| | | | | 248/619 |
| 6,412,606 B1 * | 7/2002 | Wu | ............... | F16F 7/082 |
| | | | | 188/266 |
| 6,536,990 B2 * | 3/2003 | Schubert | ............... | B60R 19/34 |
| | | | | 248/351 |
| 7,673,904 B2 * | 3/2010 | Harada | ............... | B62D 21/15 |
| | | | | 280/782 |
| 2002/0056969 A1 * | 5/2002 | Sawai | ............... | B62D 25/082 |
| | | | | 280/124.146 |
| 2008/0084065 A1 * | 4/2008 | Ogimura | ............... | F16L 27/1012 |
| | | | | 285/369 |
| 2011/0315495 A1 * | 12/2011 | Lafitte | ............... | F16F 7/08 |
| | | | | 188/381 |
| 2014/0375041 A1 * | 12/2014 | Nakajima | ............... | F16F 9/3207 |
| | | | | 280/782 |

\* cited by examiner

FIG. 14

VEHICLE BODY REINFORCEMENT APPARATUS

CROSS REFERENCE TO RELATED APPLICATIONS

This application is based on and claims priority under 35 U.S.C. §119 to Japanese Patent Application 2014-176742, filed on Sep. 1, 2014, the entire content of which is incorporated herein by reference.

TECHNICAL FIELD

This disclosure generally relates to a vehicle body reinforcement apparatus.

BACKGROUND DISCUSSION

A vehicle body reinforcement apparatus that is configured to be attached to an existing vehicle is known to extend in a front-rear direction or in a lateral direction of a vehicle body and to include brackets at opposed ends in an axial direction so as to be fixed to the vehicle body via the brackets. For example, JP4865698B, which is hereinafter referred to as Reference 1, discloses a vehicle body reinforcement apparatus for a vehicle which may easily improve a ride quality of the vehicle by attaching the vehicle body reinforcement apparatus to the vehicle depending on a driver's preference. Specifically, the vehicle body reinforcement apparatus disclosed in Reference 1 includes an elongated configuration and a hydraulic attenuator at a portion of the elongated configuration. The hydraulic attenuator serving as a hydraulic damping force generating means generates a damping force for deformation of the vehicle body reinforcement apparatus that expands and contracts in a longitudinal direction thereof.

According to the vehicle body reinforcement apparatus disclosed in Reference 1, the hydraulic attenuator is used as the damping force generating means, however, it is uneasy to adjust the damping force for displacement of the vehicle body reinforcement apparatus. In addition, various hydraulic attenuators are necessarily prepared depending on vehicle models, attachment portions and the like, which leads to a lack of versatility as a post-attaching part that is configured to be attached to a vehicle.

A need thus exists for a vehicle body reinforcement apparatus which is not susceptible to the drawback mentioned above.

SUMMARY

According to an aspect of this disclosure, a vehicle body reinforcement apparatus extending along at least one of a front-rear direction and a width direction of a vehicle body, the vehicle body reinforcement apparatus includes at least two brackets via which the vehicle body reinforcement apparatus is fixed to the vehicle body, a housing connected to one of the two brackets, a rod including a first end portion that is movably housed within the housing and a second end portion connected the other of the two brackets, a spring member disposed between the first end portion of the rod and the housing and applying a biasing force to the rod against a force for increasing and decreasing a distance between the two brackets in an axial direction of the rod, and a friction mechanism mounted to the housing and pressing the rod in a direction orthogonal to the axial direction of the rod.

According to another aspect of this disclosure, a vehicle body reinforcement apparatus extending along at least one of a front-rear direction and a width direction of a vehicle body, the vehicle body reinforcement apparatus includes at least two brackets via which the vehicle body reinforcement apparatus is fixed to the vehicle body, a housing connected to one of the two brackets, a rod including a solid body which is supported to be movable along an axial direction within the housing and a cylinder hollow body connected to the other of the two brackets, a spring member disposed between the solid body of the rod and the housing and applying a biasing force to the rod against a force for changing a distance between the two brackets in the axial direction of the rod, and a friction mechanism provided at the housing and pressing the solid body of the rod in a direction orthogonal to the axial direction of the rod.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 12:
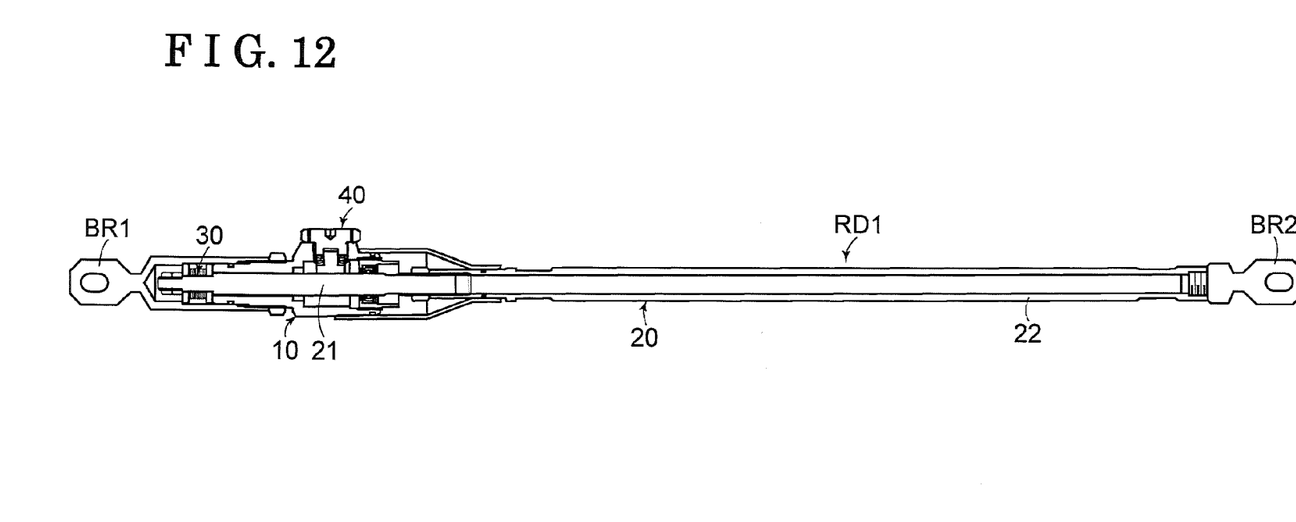
FIG. 12 is a cross-sectional view illustrating the vehicle body reinforcement apparatus according to the first embodiment.

First to third embodiments disclosed here are explained with reference to the attached drawings. FIG. 12 illustrates an entire construction of a vehicle body reinforcement apparatus RD1 according to the first embodiment. The vehicle body reinforcement apparatus RD1 is arranged to extend along at least one of a front-rear direction and a lateral direction (i.e., a width direction) of a vehicle body. The vehicle body reinforcement apparatus RD1 includes first and second brackets BR1 and BR2 at opposed ends in an axial direction so as to be fixed to the vehicle body via the brackets BR1 and BR2. The first bracket BR1 is integrally formed with a portion of a housing 10. A first end portion of a rod 20 is housed within the housing 10 and a second end portion of the rod 20 is screwed with the second bracket BR2. In the same way as the second bracket BR2, the first bracket BR1 may serve as a separate member from the housing 10 so as to be screwed with the housing 10. Any connection structure of the first and second brackets BR1, BR2 relative to the housing 10 is acceptable. FIG. 12 is a cross-sectional view, however, any hatching is omitted for securing visibility.

Figure 1:
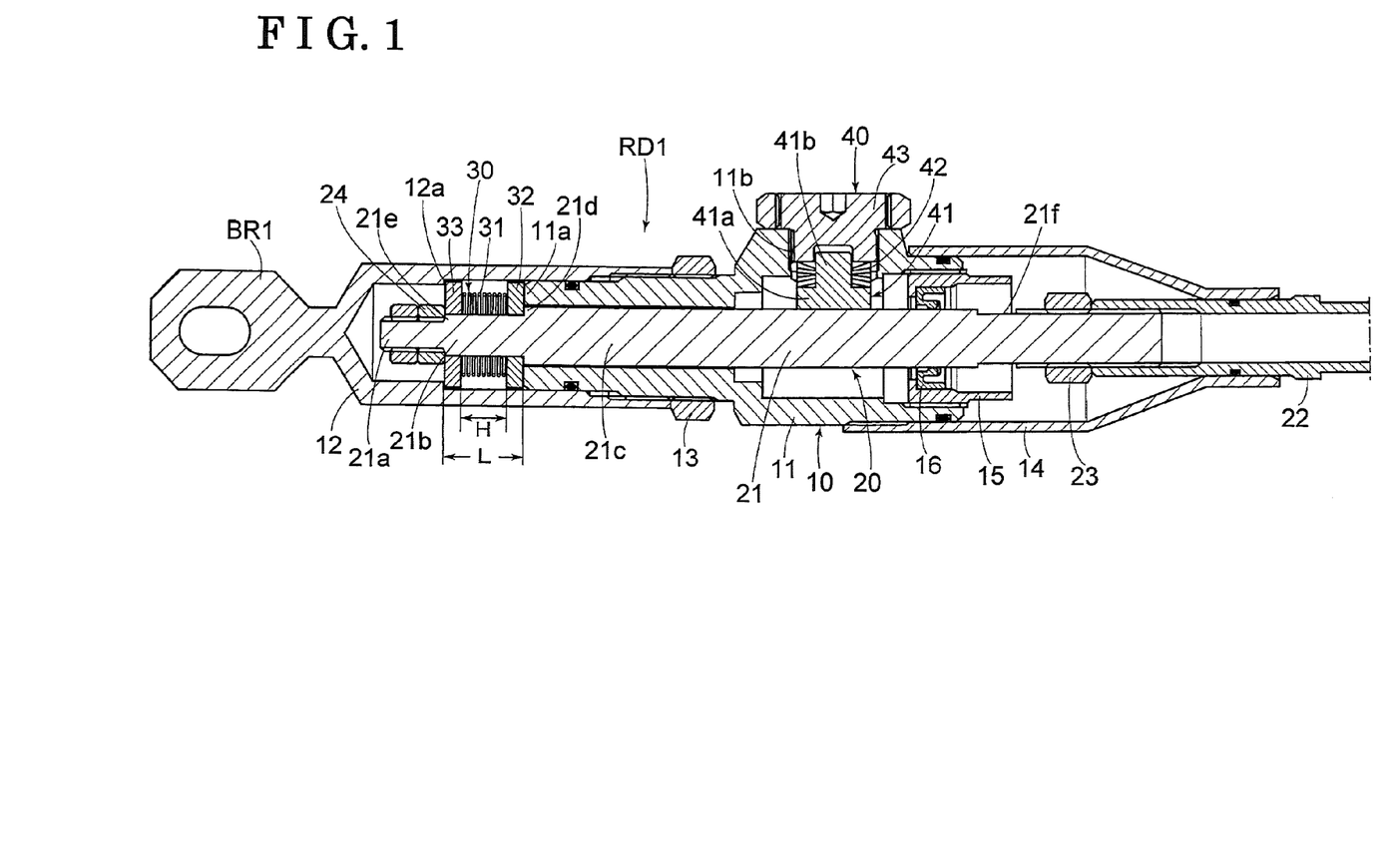
FIG. 1 is a cross-sectional view illustrating a portion of a vehicle body reinforcement apparatus according to a first embodiment disclosed here.

FIG. 1 illustrates a portion of the vehicle body reinforcement apparatus RD1 (i.e., left portion in FIG. 12). A spring member 30 serving as or constituting a rigidity adjustment mechanism is disposed between the first end portion of the rod 20 and the housing 10. The spring member 30 is configured to apply a biasing force to the rod 20 against a force for increasing or decreasing (i.e., changing) a distance (axial distance) between the first and second brackets BR1 and BR2 in the axial direction of the rod 20. A friction mechanism 40 is mounted to the housing 10 to press the rod 20 in a direction orthogonal to an axis (i.e., axial direction) of the rod 20.

The housing 10 according to the first embodiment includes a body case 11 in a tubular form serving as a first tubular member, a support case 12 in a tubular form with a bottom serving as a second tubular member and a cover 14 in a tubular form. The support case 12 is connected to a first end portion of the body case 11. The cover 14 is connected to a second end portion of the body case 11. The body case 11 and the support case 12 are screwed with each other and are held at a predetermined position by a nut 13. The first bracket BR1 is integrally formed at a bottom portion of the support case 12. The support case 12 includes different inner diameter portions from each other. An annular stepped portion 12a is formed at an inner peripheral surface of the support case 12. The spring member 30 is housed within the support case 12 and the friction mechanism 40 is mounted to the body case 11.

The rod 20 according to the first embodiment is divided into a solid body 21 and a cylinder hollow body 22 which are screwed with each other so that the solid body 21 and the cylinder hollow body 22 are held in a predetermined axial length by a nut 23. The solid body 21 is formed in a stepped configuration including a small diameter portion 21a, an intermediate diameter portion 21b and a large diameter portion 21c from an end portion (i.e., left end portion in FIG. 1) towards a portion where the solid body 21 and the cylinder hollow body 22 are screwed with each other. A first stepped portion 21d is formed between the large diameter portion 21c and the intermediate diameter portion 21b and a second stepped portion 21e is formed between the intermediate diameter portion 21b and the small diameter portion 21a. A threaded portion is formed at an outer peripheral surface of the small diameter portion 21a to be screwed with a pair of nuts 24 so that each of the nuts 24 is held at a desired axial position (i.e., at a set position). The large diameter portion 21c is slidably fitted in the body case 11.

A compression coil spring 31 including a cylindrical configuration and constituting the spring member 30 of the first embodiment is wound around the intermediate diameter portion 21b. Washers 32 and 33 are mounted at axially opposed sides of the compression coil spring 31. Specifically, the compression coil spring 31 is disposed between the washer 32 that makes contact with the first stepped portion 21d between the intermediate diameter portion 21b and the large diameter portion 21c and the washer 33 that makes contact with the nut 24. In an initial state as illustrated in FIG. 1, the compression coil spring 31 is arranged to extend in a state where the washer 32 is in contact with an end portion 11a of the body case 11 and the washer 33 is in contact with the annular stepped portion 12a of the support case 12.

The compression coil spring 31 is disposed so that a first axial end portion of the compression coil spring 31 is supported at a first axial position (where the first stepped portion 21d is provided) of the rod 20 via the washer 32 and a second axial end portion of the compression coil spring 31 is supported at a second axial position (where the pair of nuts 24 is provided) of the rod 20 via the washer 33 in a state where the compression coil spring 31 is disposed to extend between the washers 32 and 33. The second axial position is apart from the first axial position by a predetermined distance L. In addition, the compression coil spring 31 is disposed so that the first axial end portion and the second axial end portion of the compression coil spring 31 are supported at a first engagement portion (end portion 11a) and a second engagement portion (annular stepped portion 12a) via the washers 32 and 33 respectively. The first engagement portion and the second engagement portion are formed to be spaced away from each other by the predetermined distance L within the housing 10. Accordingly, an axial length of the compression coil spring 31 in the initial state as illustrated in FIG. 1, i.e., an attachment height H of the compression coil spring 31, is obtained by subtracting respective thicknesses of the washers 32 and 33 from the predetermined distance L and is adjustable by the nuts 24. The attachment height H adjusted by the nuts 24 is minimum at a position where the nut 24 makes contact with the second stepped portion 21e.

The friction mechanism 40 of the first embodiment is mounted to the body case 11 and is configured so that a friction member 41 of the friction mechanism 40 presses the rod 20 in a direction orthogonal to the axis of the rod 20. That is, as illustrated in FIG. 1, the friction member 41 is inserted to be positioned within a screw hole 11b formed at a side surface of a cylindrical portion of the body case 11. A press-contact portion 41a of the friction member 41 is arranged to make contact with an outer peripheral surface of the large diameter portion 21c of the solid body 21. In addition, a disc spring 42 is disposed around a shaft portion 41b of the friction member 41 so that a bolt member 43 is screwed with the screw hole 11b and is held at a predetermined position. Because of a biasing force of the disc spring 42, the friction member 41 is held while being pressed against the solid body 21. In a case where the body case 11 (housing 10) and the solid body 21 (rod 20) move relative to each other, a friction force of the friction member 41 is configured to be applied between the body case 11 (housing 10) and the solid body 21 (rod 20). Instead of the disc spring 42, a compression coil spring, for example, may be employed.

A cover body 15 in a cylinder hollow form is screwed with an opening end portion of the body case 11. A seal member 16 is held at an inner peripheral surface of the cover body 15 so as to make contact with the solid body 21. A pair of plane portions 21f is formed at the solid body 21 so as to be parallel to the axis of the solid body 21 (rod 20). The pair of plane portions 21f serves as a portion grasped by a jig or a tool, for example, in a case where the solid body 21 is screwed with the cylinder hollow body 22.

Figure 13:
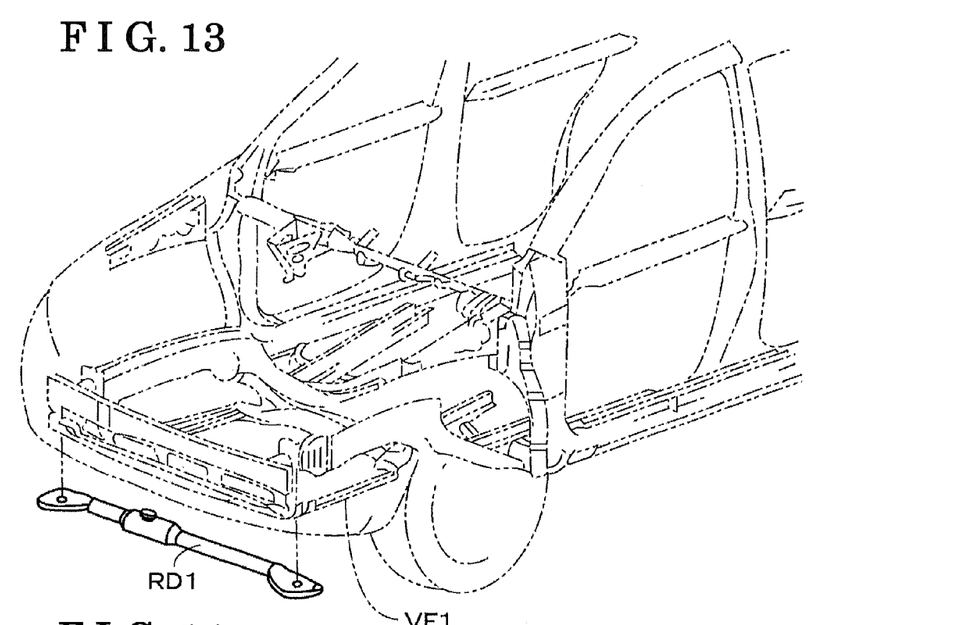
FIG. 13 is a perspective view illustrating a first example where the vehicle body reinforcement apparatus according to the first embodiment is attached to a vehicle.
Figure 14:
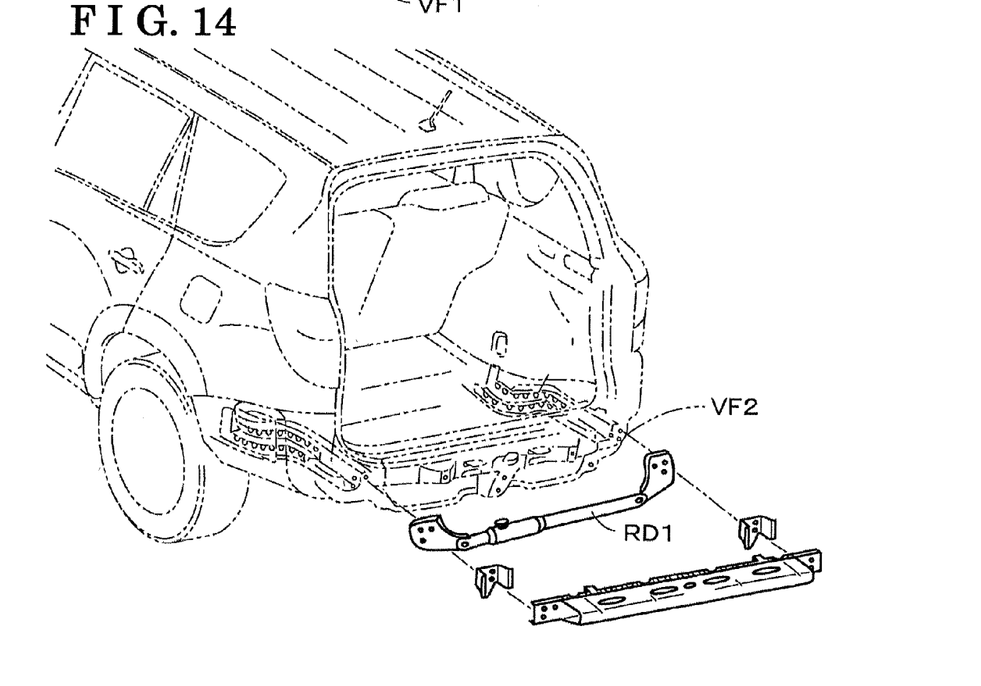
FIG. 14 is a perspective view illustrating a second example where the vehicle body reinforcement apparatus according to the first embodiment is attached to the vehicle.

The vehicle body reinforcement apparatus RD1 constructed as mentioned above and illustrated in FIG. 12 is mounted or attached to a vehicle body frame VF1 illustrated by a chain double-dashed line in FIG. 13 from a lower side of the vehicle or is mounted or attached to a vehicle body frame VF2 illustrated by a chain double-dashed line in FIG. 14 from a rear side of the vehicle so as to be fixed to the vehicle body frame VF1 or VF2 by a bolt. In a case where an external force is applied to the vehicle body reinforcement apparatus RD1 in a direction where the axial distance between the first and second brackets BR1 and BR2 increases, the biasing force for decreasing the aforementioned axial distance is applied to the rod 20 by the compression of the spring member 30 illustrated in FIG. 1. On the other hand, in a case where the external force is applied to the vehicle body reinforcement apparatus RD1 in a direction where the axial distance between the first and second brackets BR1 and BR2 decreases, the biasing force for increasing the aforementioned axial distance is applied to the rod 20 by the compression of the spring member 30. Accordingly, rigidity between the first and second brackets BR1 and BR2 is adjusted so that the spring member 30 functions as the rigidity adjustment mechanism. The friction force of the friction mechanism 40 applied to the rod 20 functions as a braking force for the operation of the rod 20 in association with the aforementioned compression of the spring member 30 to thereby restrain a rapid displacement of the rod 20 relative to the housing 10 and restrain an amplitude upon vibration of the rod 20 so that the friction mechanism 40 functions as an attenuation mechanism.

In FIGS. 1 and 12, in a case where the external force is applied to increase the axial distance between the first and second brackets BR1 and BR2, a force is applied in a direction where the housing 10 and the rod 20 relatively separate from each other. In a case where the housing 10 illustrated in FIG. 1 is specified in a fixed position, the rod 20 is displaced relative to the housing 10 and the force is generated to move the solid body 21 in a right direction in FIG. 1. As a result, the distance between the washers 32 and 33 decreases in a state where the washer 32 is pressed by the end portion 11a of the body case 11 and the washer 33 is pressed by the nut 24. The compression coil spring 31 is compressed between the washers 32 and 33 so that a force is applied to the housing 10 and the rod 20 against the force applied in the direction where the housing 10 and the rod 20 relatively separate from each other. During the aforementioned operation, the washer 32 separates from the first stepped portion 21d of the solid body 21 and the washer 33 separates from the annular stepped portion 12a of the support case 12.

On the other hand, in a case where the external force is applied to decrease the axial distance between the first and second brackets BR1 and BR2, a force is applied in a direction where the housing 10 and the rod 20 relatively approach each other. In a case where the housing 10 is specified in the fixed position, the rod 20 is displaced relative to the housing 10 and the force is generated to move the solid body 21 in a left direction in FIG. 1. As a result, the distance between the washers 32 and 33 decreases in a state where the washer 32 is pressed against the first stepped portion 21d of the solid body 21 and the washer 33 is pressed against the annular stepped portion 12a of the support case 12. That is, also in this case, the compression coil spring 31 is compressed between the washers 32 and 33, however, a force is applied to the housing 10 and the rod 20 against the force applied in the direction where the housing 10 and the rod 20 relatively approach each other. During the aforementioned operation, the washer 32 separates from the end portion 11a of the body case 11 and the washer 33 separates from the nut 24.

Figure 4:
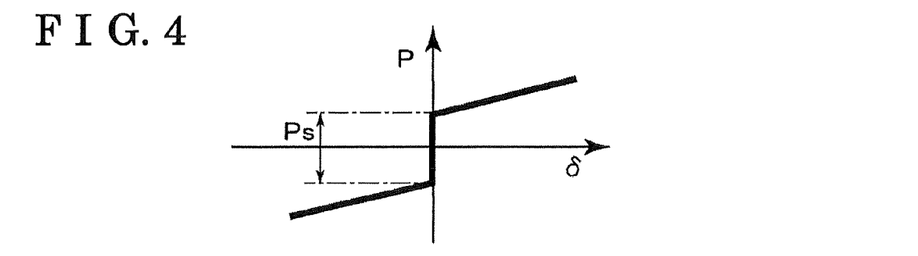
FIG. 4 is a graph illustrating spring characteristics of a spring member provided at the vehicle body reinforcement apparatus according to the first embodiment.
Figure 5:
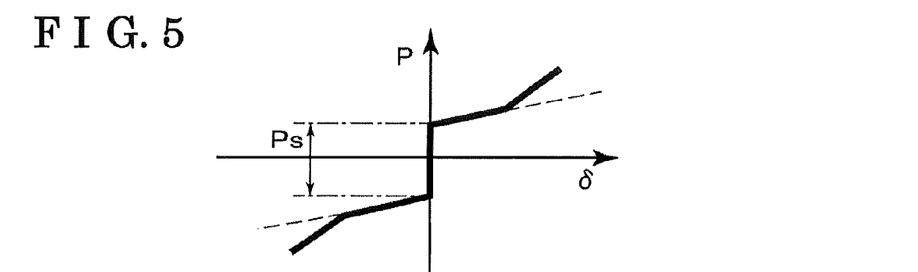
FIG. 5 is a graph illustrating spring characteristics of a spring member provided at the vehicle body reinforcement apparatus according to the second embodiment.

Accordingly, in either case where the external force is applied in the direction where the axial distance between the first and second brackets BR1 and BR2 increases or decreases, the compression coil spring 31 is compressed between the washers 32 and 33 so as to generate the force against the aforementioned external force. Thus, the rigidity between the first and second brackets BR1 and BR2 is adjusted. Specifically, linear spring characteristics as illustrated in FIG. 4 (in a graph, δ is a deflection and P is a load, which is also applied to FIGS. 5, 7, 9 and 11) are obtained by the compression coil spring 31 in the cylindrical configuration (i.e., including a uniform wire diameter and a uniform pitch). A set load (Ps) is adjustable depending on the attachment height H of the compression coil spring 31 that is adjustable by the nuts 24. In the aforementioned either case, the friction force of the friction mechanism 40 is applied to the solid body 21 (rod 20) as the braking force to thereby restrain the rapid displacement of the rod 20 relative to the housing 10 and restrain the amplitude upon vibration of the rod 20.

Figure 6:
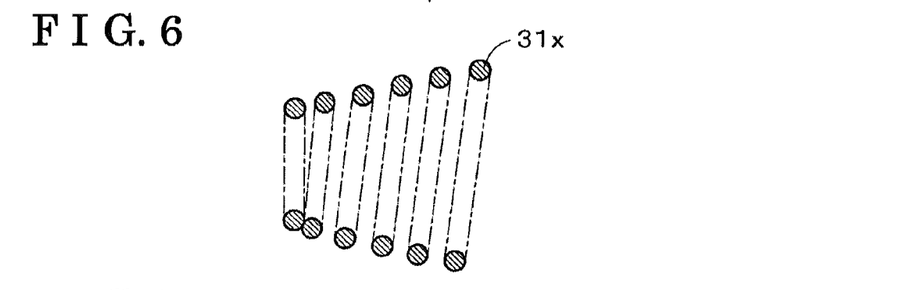
FIG. 6 is a cross-sectional view of another example of the spring member provided at the vehicle body reinforcement apparatus according to the first embodiment.
Figure 7:
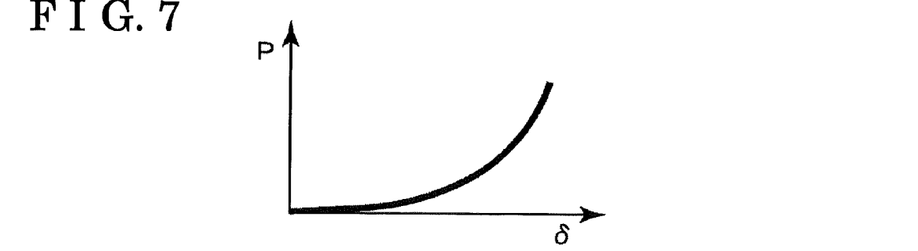
FIG. 7 is a graph illustrating spring characteristics of the spring member illustrated in FIG. 6.
Figure 8:
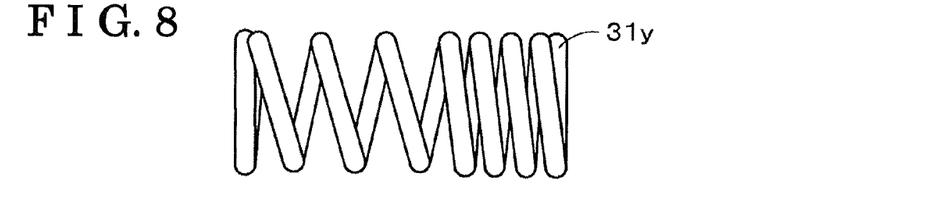
FIG. 8 is a front view of still another example of the spring member provided at the vehicle body reinforcement apparatus according to the first embodiment.
Figure 9:
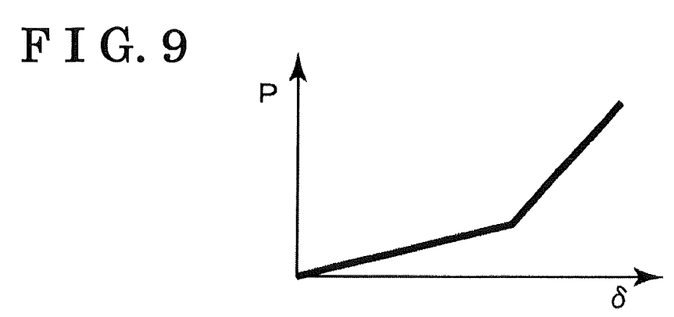
FIG. 9 is a graph illustrating spring characteristics of the spring member illustrated in FIG. 8.
Figure 10:
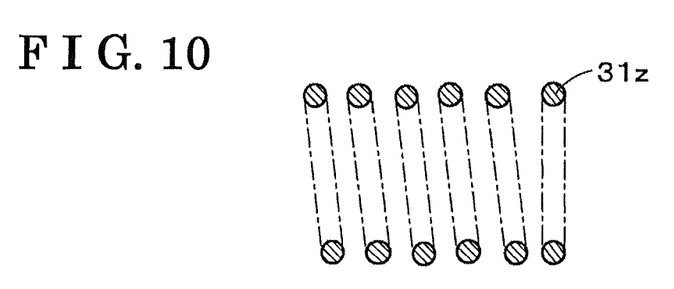
FIG. 10 is a cross-sectional view of still another example of the spring member provided at the vehicle body reinforcement apparatus according to the first embodiment.
Figure 11:
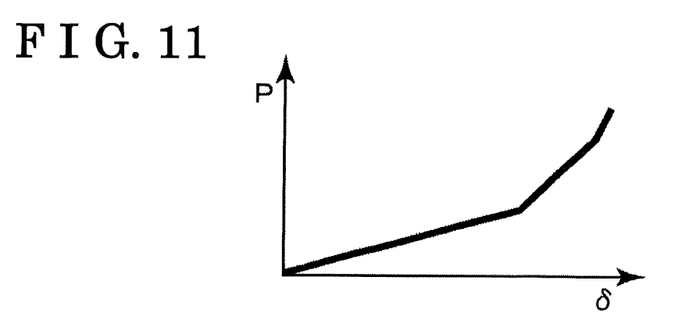
FIG. 11 is a graph illustrating spring characteristics of the spring member illustrated in FIG. 10.

The aforementioned washers 32 and 33 may not be necessarily provided. As long as the aforementioned relation between the housing 10 (support case 12) and the rod 20 (solid body 21) is maintained independently or solely by the compression coil spring 31, seating faces of the compression coil spring 31 at respective ends thereof may be formed in flat faces and the washers 32 and 33 may be omitted. In addition, instead of the compression coil spring 31 in the cylindrical configuration, a compression coil spring illustrated in FIG. 6, 8 or 10 may be used or plural disc springs stacked one another may be used, for example. FIG. 6 illustrates a compression coil spring 31x in a conical form (including a uniform pitch or a uniform pitch angle) which may obtain nonlinear spring characteristics as illustrated in FIG. 7. FIG. 8 illustrates a compression coil spring 31y serving as an irregular pitch (dual pitch) spring which may obtain nonlinear spring characteristics as illustrated in FIG. 9. FIG. 10 illustrates a compression coil spring 31z in a tapered form which may obtain nonlinear spring characteristics as illustrated in FIG. 11.

Figure 2:
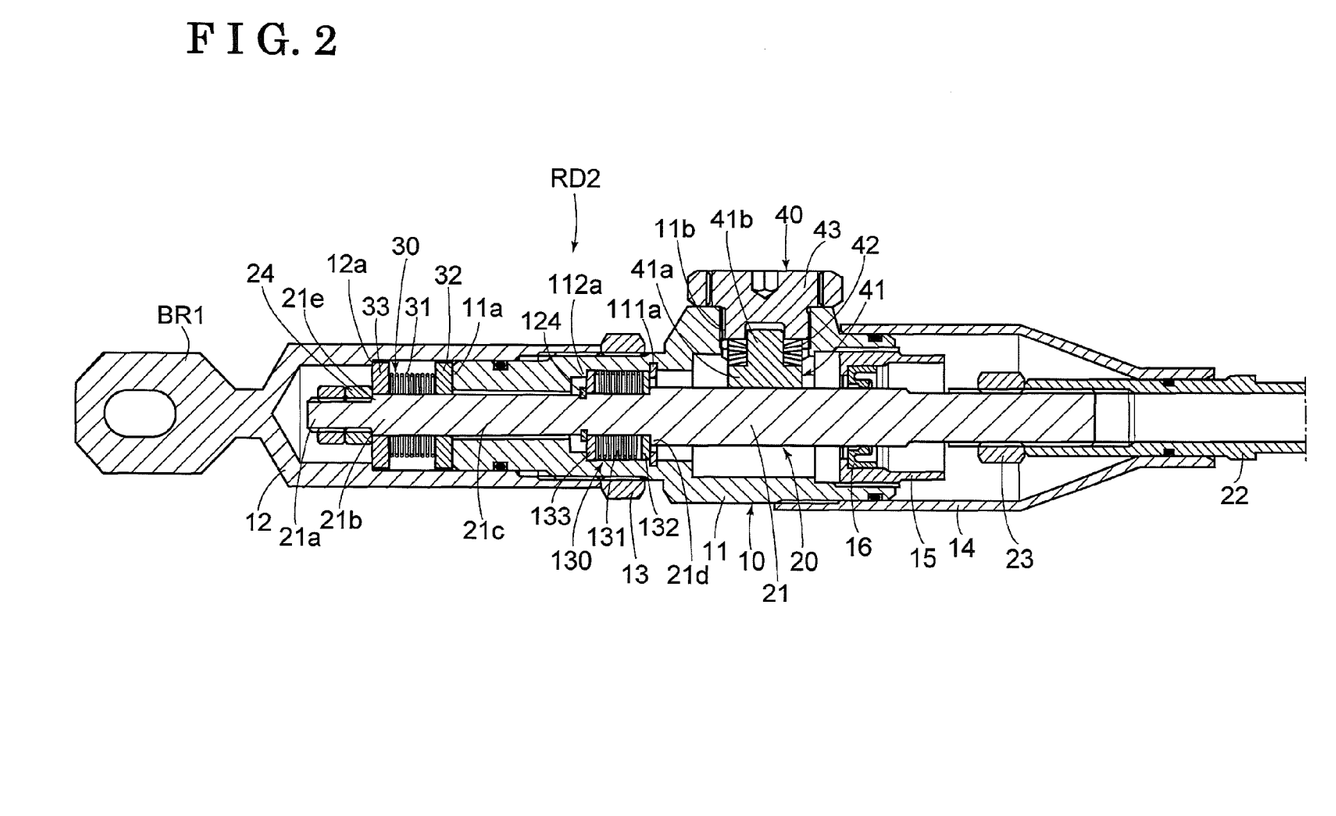
FIG. 2 is a cross-sectional view illustrating a portion of a vehicle body reinforcement apparatus according to a second embodiment disclosed here.

FIG. 2 illustrates a portion of a vehicle body reinforcement apparatus RD2 (left portion in FIG. 12) according to the second embodiment. The vehicle body reinforcement apparatus RD2 further includes a compression coil spring 131 in a cylindrical form constituting a second spring member 130 relative to the vehicle body reinforcement apparatus RD1 of the first embodiment. The compression coil spring 131 is provided at an intermediate portion (larger diameter portion 21c of the solid body 21) of the rod 20. The second spring member 130 and related components thereof bear reference numerals obtained by adding one hundred (100) to reference numerals of the spring member (spring member 30) and related components thereof illustrated in FIG. 1 including the same functions as the second spring member 130 and the related components thereof. At this time, however, a member 111a (corresponding to the end portion 11a) constituting the first engagement portion and a member 124 (corresponding to the nut 24) constituting the second engagement portion are configured by C-shaped retaining rings so as to engage with the body case 11 and the solid body 21, respectively. The other construction of the second embodiment is the same as the first embodiment and thus components or members of the second embodiment substantially the same as those of the first embodiment bear the same reference numerals and an explanation is omitted.

According to the vehicle body reinforcement apparatus RD2 of the second embodiment as illustrated in FIG. 2, in either case where the external force is generated for increasing or decreasing the axial distance between the first and second brackets BR1 and BR2, the compression coil spring 31 is compressed between the washers 32 and 33, and the compression coil spring 131 is compressed between washers 132 and 133. Thus, the force is generated against the aforementioned external force to thereby adjust the rigidity between the first and second brackets BR1 and BR2. Because of the compression coil springs 31 and 131, spring characteristics illustrated in FIG. 5, for example, are obtainable. Specifically, the compression coil spring 131 is in a free state (i.e., no set load) when initially assembled. In a case where the displacement of the rod 20 equal to or greater than a predetermined distance occurs, the load by the compression coil spring 131 in addition to the load by the compression coil spring 31 is applied to the rod 20 so as to obtain two-stage bending characteristics illustrated in FIG. 5. In the aforementioned either case, the friction force of the friction mechanism 40 is applied as the braking force to the solid body 21 (rod 20) to thereby restrain the rapid displacement of the rod 20 relative to the housing 10 and restrain the amplitude upon vibration of the rod 20.

Figure 3:
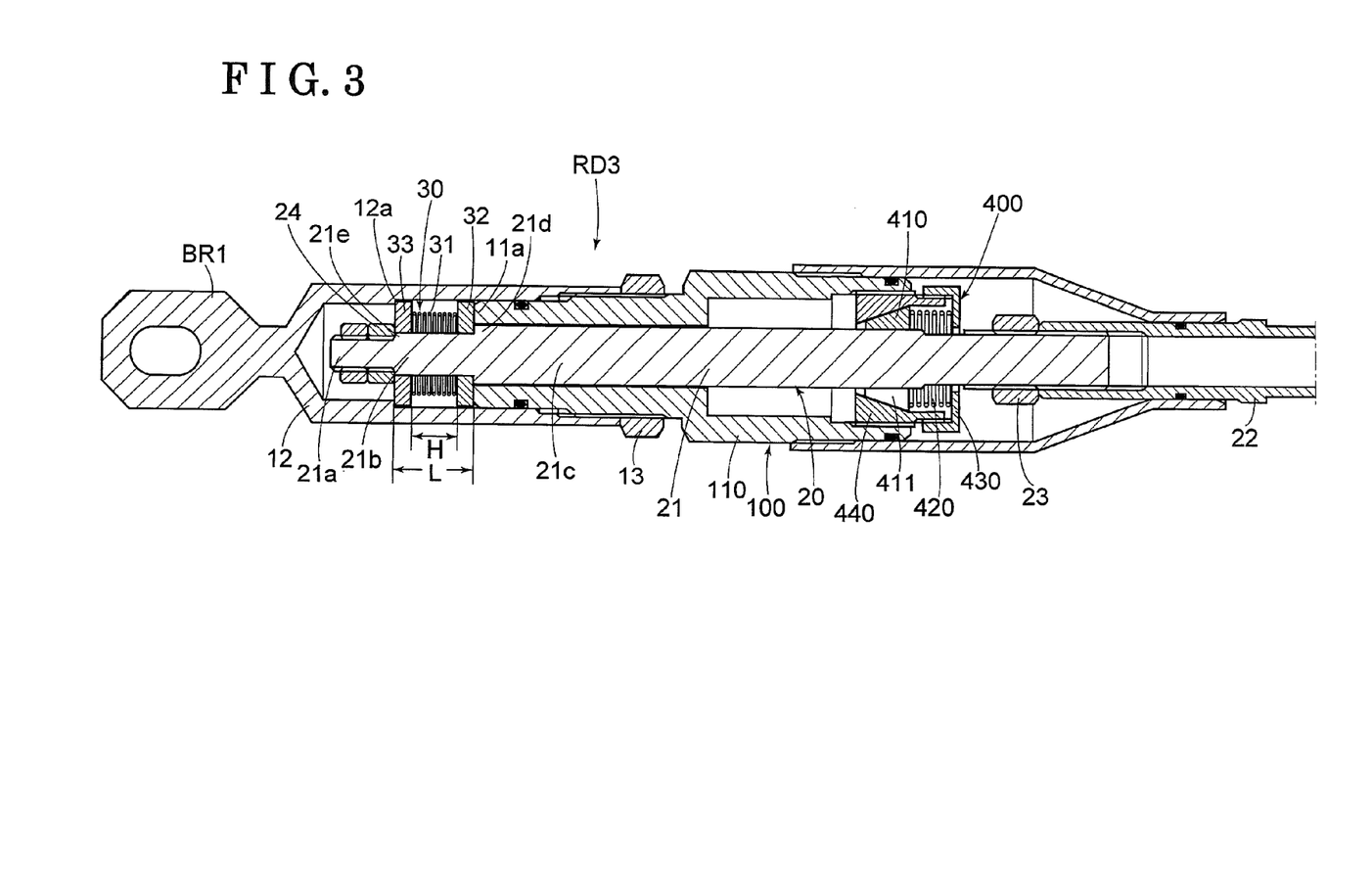
FIG. 3 is a cross-sectional view illustrating a portion of a vehicle body reinforcement apparatus according to a third embodiment disclosed here.

FIG. 3 illustrates a portion of a vehicle body reinforcement apparatus RD3 (left portion in FIG. 12) according to the third embodiment. As compared to the vehicle body reinforcement apparatus RD1 of the first embodiment, the construction of the friction mechanism is different and the cover body 15 and the seal member 16 are not provided in the third embodiment. The other construction of the third embodiment is the same as the first embodiment. Thus, the substantially same members of the third embodiment as the first embodiment bear the same reference numerals and explanations are omitted. A body case 110 (housing 100) of the third embodiment includes a different construction as the body case 11 (housing 10) of the first embodiment as illustrated in FIG. 1 and thus bears a different reference numeral from the first embodiment.

As illustrated in FIG. 3, a friction mechanism 400 of the third embodiment includes a tube member 440 including an inner peripheral surface in a tapered form. The tube member 440 is arranged to surround the solid body 21 (rod 20) and is screwed with the body case 110. The friction mechanism 400 also includes an annular friction member (which is hereinafter simply referred to as an annular member) 410 which includes an outer peripheral surface in a tapered form making contact with the inner peripheral surface of the tube member 440 and which includes an inner peripheral surface making contact with an outer peripheral surface of the solid body 21. A cutting 411 in parallel to the axis of the solid body 21 is formed at the annular member 410. The annular member 410 is housed within the tube member 440 to surround the solid body 21. The friction mechanism 400 further includes a compression coil spring 420 serving as a biasing member for biasing the annular member 410 in the axial direction of the solid body 21 (rod 20). The compression coil spring 420 is housed within the tube member 440. The friction mechanism 400 further includes a nut member 430 screwed with the tube member 440 and functioning as a support member supporting the compression coil spring 420. Depending on a screwed position of the nut member 430 relative to the tube member 440, the biasing force of the compression coil spring 420 is adjustable. The cutting 411 is not limited to a slit of which axially opposed ends are open and may be a groove of which an axial end portion remains. Plural cuttings 411 may be provided at plural portions of the annular member 410.

The annular member 410 and the tube member 440 are adjoined to each other via the outer peripheral surface and the inner peripheral surface thereof each of which is in the tapered form. In addition, the annular member 410 is biased in the axial direction of the solid body 21 by the biasing force of the compression coil spring 420. Thus, by a component force of the above, the annular member 410 is biased in a direction orthogonal to the axis of the solid body 21 to press the outer peripheral surface of the solid body 21. Accordingly, the annular member 410 and the tube member 440 function as a collet chuck and the annular member 410 is held in a state to be pressed against the solid body 21 (rod 20) by the biasing force of the compression coil spring 420. In a case where the body case 11 (housing 10) and the solid body 21 (rod 20) move relative to each other, the friction force of the annular member 410 is applied between the body case 11 (housing 10) and the solid body 21 (rod 20). The aforementioned friction force functions as the braking force, in the same way as the first embodiment, for the relative movement between the housing 10 and the rod 20 to thereby restrain the rapid displacement of the rod 20 relative to the housing 10 and restrain the amplitude upon vibration of the rod 20.

Accordingly, in the vehicle body reinforcement apparatus RD3 of the third embodiment, the body case 110 of the housing 100 may be simply configured and all the components of the friction mechanism 400 may be housed within the housing 100. Thus, the entire vehicle body reinforcement apparatus may be simply configured and easily mounted or attached to the vehicle.

According to the aforementioned first to third embodiments, the rigidity adjustment mechanism, i.e., the spring member 30, may be simply configured. Thus, the vehicle body reinforcement apparatus RD1, RD2, RD3 which includes improved versatility may be mounted to various types of vehicles or attachment portions, for example.

In the first to third embodiments, the vehicle body reinforcement apparatus RD1, RD2, RD3 further includes the pair of nuts 24 fixed to the set position at the first end portion of the rod 20. The biasing force of the spring member 30 is adjusted on a basis of the set position at which the pair of nuts 24 is fixed.

Accordingly, rigidity adjustment may be easily performed depending on the vehicle types, attachment portions, and the like.

In addition, in the first to third embodiments, the spring member 30 is constituted by the single compression coil spring 31, 31$x$, 31$y$, 31$z$ wound around the first end portion of the rod 20, the compression coil spring 31, 31$x$, 31$y$, 31$z$ including the first axial end portion supported at the first axial position of the rod 20 and the second axial end portion supported at the second axial position of the rod 20, the second axial position being apart from the first axial position by the predetermined distance L, the first axial end portion and the second axial end portion of the compression coil spring 31, 31$x$, 31$y$, 31$z$ being supported at the first engagement portion and the second engagement portion which are formed to be spaced away from each other by the predetermined distance L within the housing 10.

Accordingly, the rigidity adjustment may be appropriately performed with the usage of the compression coil spring 31, 31x, 31y, 31z including various spring characteristics. The vehicle body reinforcement apparatus RD1, RD2, RD3 including the optimum rigidity may be provided to the various types of vehicles and attachment portions, for example.

Further, in the first to third embodiments, the housing 10, 100 includes the body case 11, 110 (first tubular member) supporting the rod 20 to be movable in the axial direction and holding the friction mechanism 40, 400, the body case 11, 110 including the first engagement portion, and the housing 10, 100 includes the support case 12 (second tubular member) joined to the body case 11, 110 and including the second engagement portion.

Accordingly, the vehicle body reinforcement apparatus RD1, RD2, RD3 may be easily assembled.

Further, in the third embodiment, the friction mechanism 400 includes the tube member 440 that includes the inner peripheral surface in a tapered form and that is held at the housing 100 to surround the rod 20, the annular member 410 housed within the tube member 440 and including the outer peripheral surface in a tapered form in contact with the inner peripheral surface of the tube member 440 and the inner peripheral surface in contact with the outer peripheral surface of the rod 20, the annular member 410 being formed with the cutting 411 in parallel to the axis of the rod 20, the compression coil spring 420 (biasing member) biasing the annular member 410 in the axial direction of the rod 20, and the nut member 430 (support member) held at the tube member 440 and supporting the compression coil spring 420, the annular member 410 being configured to press the outer peripheral surface of the rod 20 in a direction orthogonal to the axis of the rod 20.

Accordingly, all the members or components of the friction mechanism 400 may be housed within the housing 100, which leads to a simple construction of the vehicle body reinforcement apparatus RD3 and an easy attachment to the vehicle.

Further, in the second embodiment, the vehicle body reinforcement apparatus RD2 further includes the second spring member 130 disposed between the intermediate portion of the rod 20 and the housing 10 and applying the biasing force to the rod 20 against the force for increasing and decreasing the distance between the two brackets BR1 and BR2 in the axial direction of the rod 20.

Accordingly, the rigidity adjustment mechanism where the two spring characteristics are combined each other may be easily obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle body reinforcement apparatus extending along at least one of a front-rear direction and a width direction of a vehicle body, the vehicle body reinforcement apparatus comprising:
   at least two brackets via which the vehicle body reinforcement apparatus is fixed to the vehicle body;
   a housing connected to one of the two brackets;
   a rod including a first end portion that is movably housed within the housing and a second end portion connected to the other of the two brackets;
   a spring member disposed between the first end portion of the rod and the housing and applying a biasing force to the rod against a force for increasing and decreasing a distance between the two brackets in an axial direction of the rod; and
   a friction mechanism mounted to the housing and pressing the rod in a direction orthogonal to the axial direction of the rod,
   wherein the spring member is constituted by a single compression coil spring wound around the first end portion of the rod, the compression coil spring including a first axial end portion supported at a first axial position of the rod and a second axial end portion supported at a second axial position of rod, the second axial position being apart from the first axial position by a predetermined distance, the first axial end portion and the second axial end portion of the compression coil spring being supported at a first engagement portion and a second engagement portion which are formed to be spaced away from each other by the predetermined distance within the housing, and
   wherein the housing includes a first tubular member supporting the rod to be movable in the axial direction and holding the friction mechanism, the first tubular member joined to the first engagement portion, and the housing includes a second tubular member joined to the first tubular member and including the second engagement portion.

2. The vehicle body reinforcement apparatus according to claim 1, further comprising a nut fixed to a set position at the first end portion of the rod, wherein the biasing force of the spring member is adjusted on a basis of the set position at which the nut is fixed.

3. The vehicle body reinforcement apparatus according to claim 1, wherein the friction mechanism includes a tube member that includes an inner peripheral surface in a tapered form and that is held at the housing to surround the rod, an annular member housed within the tube member and including an outer peripheral surface in a tapered form in contact with the inner peripheral surface of the tube member and an inner peripheral surface in contact with an outer peripheral surface of the rod, the annual member being formed with a cutting in parallel to an axis of the rod, a biasing member biasing the annual member in the axial direction of the rod, and a support member held at the tube member and supporting the biasing member, the annual member being configured to press the outer peripheral surface of the rod in a direction orthogonal to the axis of the rod.

4. The vehicle body reinforcement apparatus according to claim 1, further comprising a second spring member disposed between an intermediate portion of the rod and the housing and applying a biasing force to the rod against the force for increasing and decreasing the distance between the two brackets in the axial direction of the rod.

5. A vehicle body reinforcement apparatus extending along at least one of a front-rear direction and a width direction of a vehicle body, the vehicle body reinforcement apparatus comprising:
   at least two brackets via which the vehicle body reinforcement apparatus is fixed to the vehicle body;

a housing connected to one of the two brackets;
a rod including a solid body which is supported to be movable along an axial direction within the housing and a cylinder hollow body connected to the other of the two brackets;
a spring member disposed between the solid body of the rod and the housing and applying a biasing force to the rod against a force for changing a distance between the two brackets in the axial direction of the rod; and
a friction mechanism provided at the housing and pressing the solid body of the rod in a direction orthogonal to the axial direction of the rod,
wherein the spring member is constituted by a single compression coil spring wound around the solid body rod, the compression coil spring including a first axial end portion supported at a first axial position of the rod and a second axial end portion supported at a second axial position of the rod, the second axial position being apart from the first axial position by a predetermined distance, the first axial end portion and the second axial end portion of the compression coil spring being supported at a first engagement portion and a second engagement portion which are formed to be spaced from each other by the predetermined distance within the housing, and
wherein the housing includes a first tubular member supporting the rod to be movable in the axial direction and holding the friction mechanism, the first tubular member including the first engagement portion, and the housing includes a second tubular member joined to the first tubular member and including the second engagement portion.

* * * * *